Feb. 28, 1967 N. ROSENSTEIN 3,306,020
METHOD AND APPARATUS FOR SPLICING YARN
Filed July 5, 1966 6 Sheets-Sheet 1

INVENTOR.
NATHAN ROSENSTEIN
BY
Paul & Paul
ATTORNEYS.

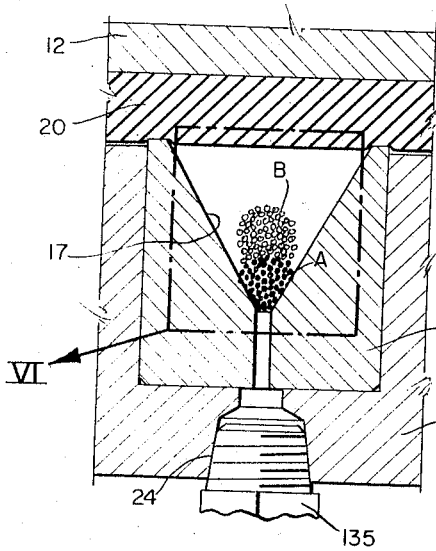
Fig. 5
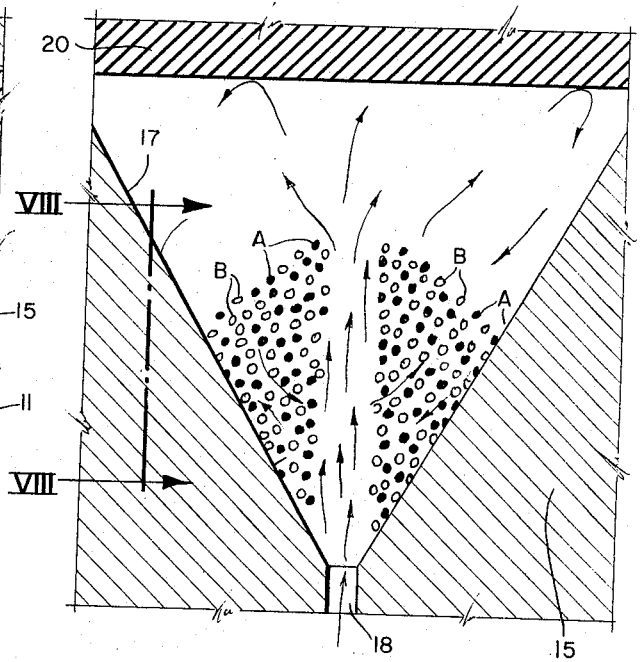
Fig. 6
Fig. 7
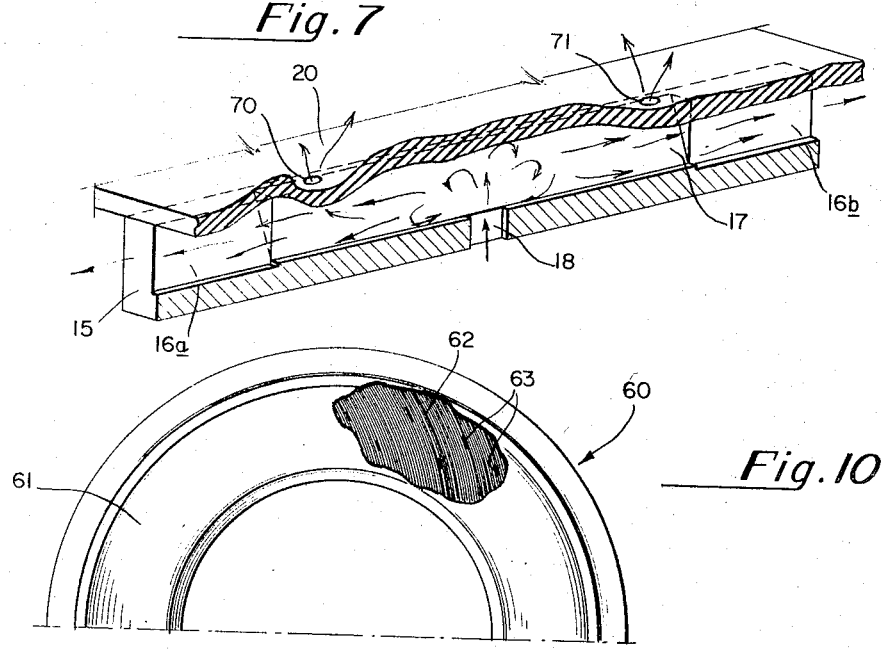
Fig. 10
INVENTOR.
NATHAN ROSENSTEIN
BY
Paul + Paul
ATTORNEYS.

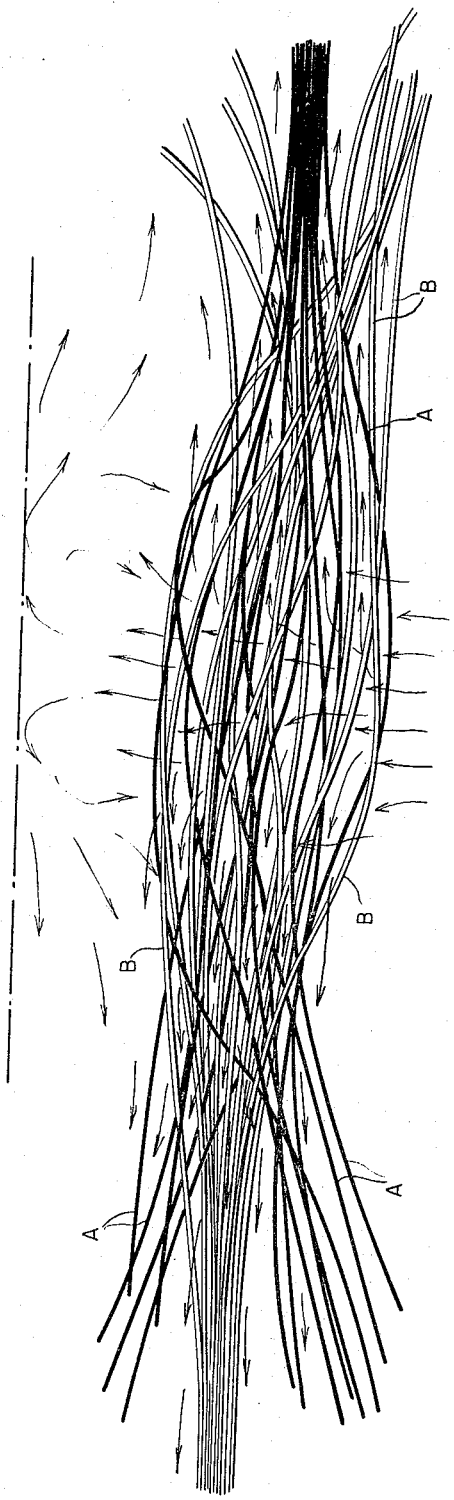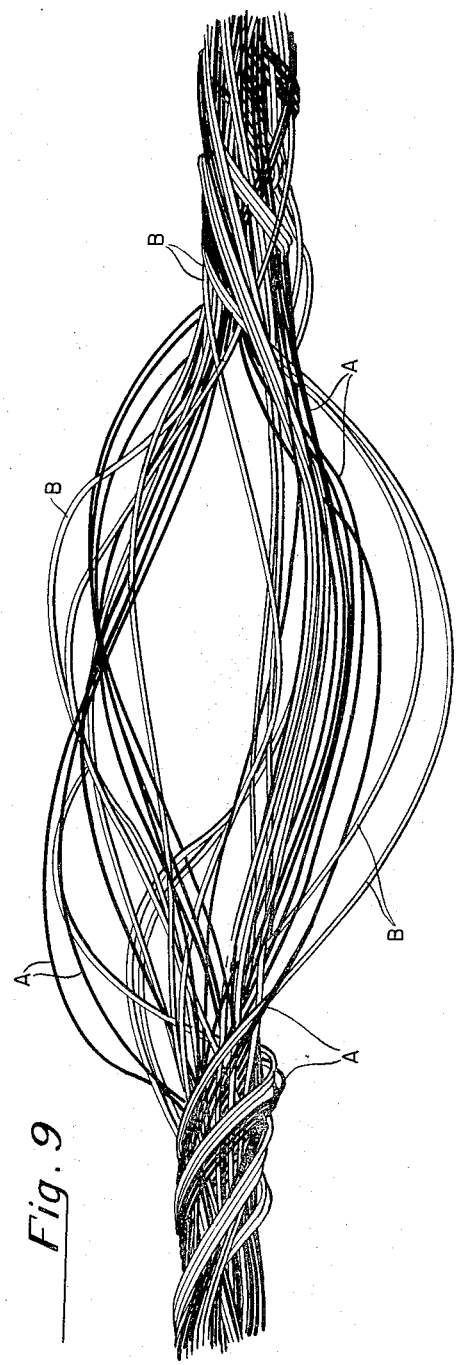

INVENTOR.
NATHAN ROSENSTEIN
BY
Paul & Paul
ATTORNEYS.

Feb. 28, 1967    N. ROSENSTEIN    3,306,020

METHOD AND APPARATUS FOR SPLICING YARN

Filed July 5, 1966    6 Sheets-Sheet 6

INVENTOR
NATHAN ROSENSTEIN
BY Paul & Paul
ATTORNEYS.

United States Patent Office 3,306,020
Patented Feb. 28, 1967

3,306,020
METHOD AND APPARATUS FOR SPLICING YARN
Nathan Rosenstein, West Hartford, Conn., assignor to Spunize Company of America, Inc., Unionville, Conn., a corporation of Connecticut
Filed July 5, 1966, Ser. No. 562,623
12 Claims. (Cl. 57—22)

This invention relates to a method and apparatus for joining together the ends of multi-filament yarns or tows, particularly continuous filament yarns.

A purpose of the invention is to provide a fast, yet effective, method for splicing together the ends of multi-filament yarns to produce a splice as strong as the yarn itself.

A further purpose is to provide a method of splicing multi-filament yarn to produce a splice which is strong, yet small enough in axial diameter or denier to pass through the nip of feed rolls for crimpers and the like without crushing.

A further purpose is to provide a method of producing a splice which is strong, yet small enough to pass through reeds, tubes, combs, the eyes of needles, and other textile treating and guiding apparatus.

Another purpose is to provide a method of making a yarn splice which is particularly suitable for use in the manufacture of tire cord fabrics, high pressure hoses, and other goods where yarn splices of high breaking strength are required.

A further purpose is to provide simple yet sturdy apparatus for carrying out the above methods.

These purposes are achieved by a method and apparatus for air splicing, as will become clear from a consideration of the following detailed description of several preferred embodiments illustrated in the drawings in which:

FIG. 1 is a perspective illustration of a splicing box used in carrying out the method of the present invention. In FIG. 1, the box is shown open, with the replaceable splicing-chamber insert shown above the open box. The two ends of yarn which are to be spliced are also shown;

FIG. 5 is a view in section generally similar to FIG. 4 but showing the two yarns in place and the box lid closed;

FIG. 6 is an enlarged view of that portion of FIG. 5 within the dot-and-dash rectangle VI. In FIG. 6, the arrows indicate the flow of the compressed air;

FIG. 7 is a fragmentary view of the splicing chamber. The flow of the compressed air is indicated by the arrows;

FIG. 8 is an enlarged schematic view showing a typical appearance of the filaments just after the air jet begins to flow through the filaments and turn in a generally axial direction, as seen looking along the line VIII—VIII of FIG. 6;

FIG. 9 is an enlarged schematic illustration of a typical splice produced by the method according to this invention;

FIG. 10 is a diagrammatic illustration of a tire showing the rubber broken away to reveal the cord fabric having yarn splices made by the method and apparatus of the present invention;

Figure 1:
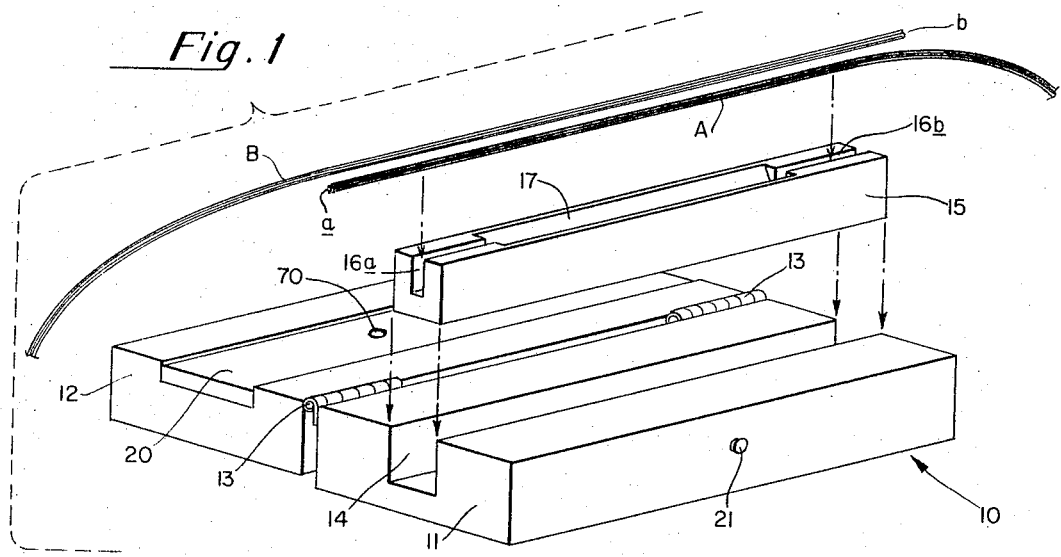
Figure 2:
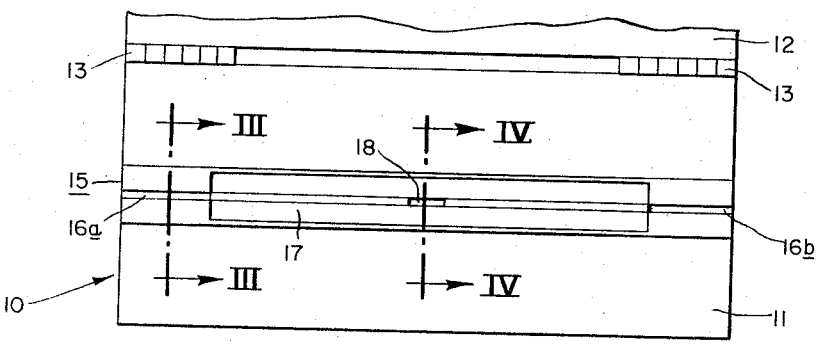
FIG. 2 is a top plan view of the base portion of the open splicing box.

Referring now to FIGS. 1–7 of the drawings, the reference numeral 10 identifies generally a splicing box for carrying out the air splicing method of the present invention. For convenience of description, it will be assumed that compressed air is used. However, other suitable gases may be employed. In the specification and claims, the term "air" is to be understood to include other suitable gases.

The box 10 is illustrated in FIGS. 1–7 as an elongated rectangular box, which may preferably but not necessarily be of aluminum, having a lower half or base 11 and an upper half or lid 12. The lid 12 is pivotally connected to the base 11 at the rear wall, as by hinges 13, to allow the box to be fully opened and closed. A hook on the front wall of the lid 12, not visible in the drawings, hooks about the stud 21 on the front wall of the base for latching the box in closed position after the yarn ends to be spliced have been inserted therein, and before the compressed air is applied.

The base 11 is provided with an elongated rectangular channel 14 which extends the full length of the base 11. Into channel 14 a removable insert 15 is inserted. Insert 15 has a narrow rectangular notch at each end, identified as 16a and 16b. The central portion of insert 15 is cut out forming a splicing chamber 17. In FIGS. 1–7 of the drawings, splicing chamber 17 in shown to have a V-shaped cross section with a flattened tip, but other cross-sectional shapes may be used. In FIGS. 1–7, the flat tip which forms the floor of the splicing chamber 17 is shown as raised slightly above the floors of the rectangular notches 16a and 16b, but this is not an essential feature. Insert 15 is made removable so that it may be replaced with another insert having different size notches, and/or a different size and/or shape of splicing chamber, and/or a different size of air-injection slot, to accommodate different sizes of yarns.

An air-injection slot 18 extends vertically through the insert 15 from its undersurface to the flat tip of the splicing chamber 17. Slot 18 extends coaxially. Its length is short, relative to the length of the splicing chamber 17, and its width is narrow relative to its length. In the drawings, air-injection slot 18 is shown as having a width equal to that of the flat-tip floor of chamber 17. In a typical case, the length of the air-injection slot may be 5/32 inch, and its width may be 1/32 inch.

Figure 3:
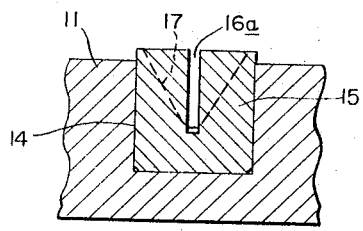
FIG. 3 is a view in section of the base, near the end thereof, looking along the line III—III in FIG. 2.
Figure 4:
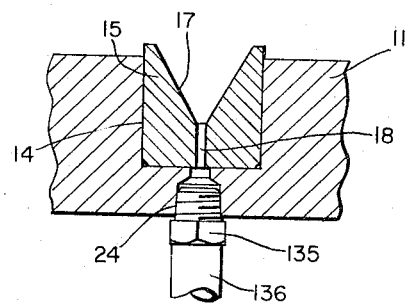
FIG. 4 is a view in section of the center part of the base looking along the line IV—IV of FIG. 2, showing the air slot.

The lid 12 of the box 10 has a central cutout portion on its undersurface into which is inserted a gasket 20 of rubber or other suitable resilient air-sealing material. When the insert 15 is inserted in the channel 14 in base 11, the upper edges of the insert 15 project somewhat above the upper surface of the base 11, as seen in FIGS. 3, 4 and 5. Thus, when the lid 12 is closed, the gasket 20 is compressed by the projecting edges of the insert 15, as seen in FIG. 5, and, except for the air-escape holes 70 and 71, a good air seal is effected. Two air-escape holes 70 and 71 are provided in the lid, one near each end of the splicing chamber 17. These escape holes extend through the lid 12 and gasket 20.

As indicated in FIGS. 4 and 5, a tapped hole 24 is provided in the underside of the base 11 at its center point for receiving the externally-threaded connector 135 to which is attached a flexible hose 136 through which compressed air is applied. The tapped hole 24 communicates with the air-injection slot 18 in the insert 15.

The manner in which the splicing box 10 illustrated in FIGS. 1–7 is used to air splice together two multi-filament yarns, such as of polypropylene or polyester or other continuous filament fibers, will now be described.

In FIG. 1, a multi-filament yarn A is to be spliced to a multi-filament yarn B. For convenience of identification in FIGS. 5 and 6, yarn A will be illustrated as consisting of black filaments and yarn B will be illustrated as consisting of white filaments. In FIG. 1, the terminal end of yarn A is identified by the letter $a$. The yarn A continues to the right for a considerable length beyond the right edge of the drawing. Similarly, the terminal end of yarn B is identified as $b$. Yarn B continues to the left for a considerable length beyond the edge of the drawing. Insert 15, which for purposes of illustration is shown in FIG. 1 raised above the base 11 of the splicing box 10, is inserted into the channel 14 and assumes the position shown in cross-section in FIGS. 3 and 4. Yarn A is first spread across the insert 15 and laid in the notches 16a and 16b. The terminal end $a$ of yarn A extends slightly beyond the left edge of the base 11 of splicing box 10. Next, yarn B is spread across insert 15 and laid in the notches 16a and 16b on top of yarn A in superposed overlapping relation with its terminal end $b$ extending slightly beyond the right edge of the base 11 of the splicing box. The yarn diameter of each of the superposed yarns is slightly smaller than the width of the notches so that the two yarns A and B may be easily held in superposed position by the vertical walls of the notches. In the splicing chamber 17, the yarns have adequate room to move laterally. To assist in placing yarns A and B in the notches 16a and 16b, the upper outer edges of the notches may be filleted.

Figure 13:
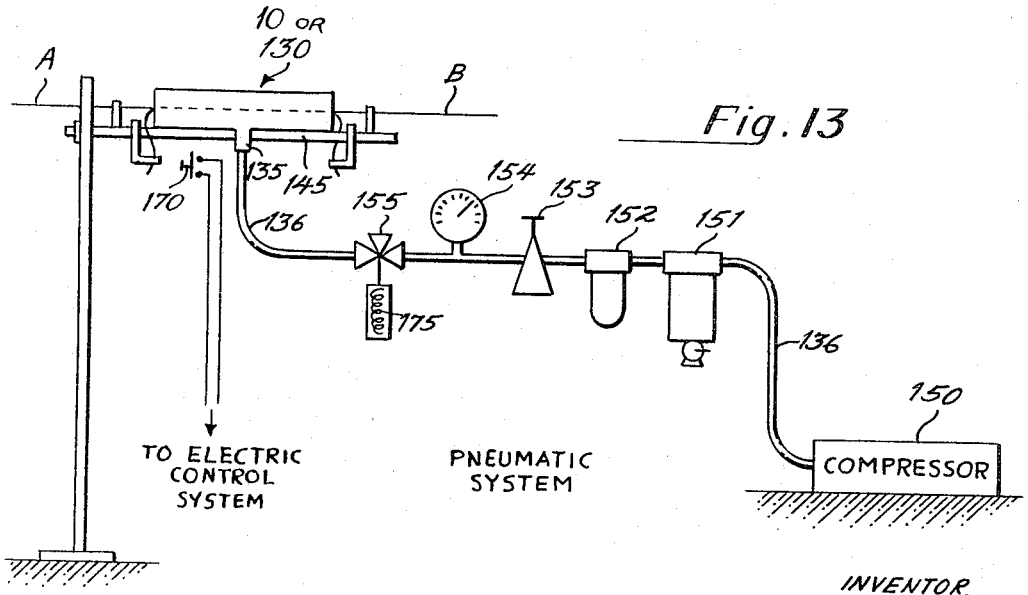
FIG. 13 is a schematic diagram of a suitable air supply system for supplying compressed air to the splicing box.
Figure 14:
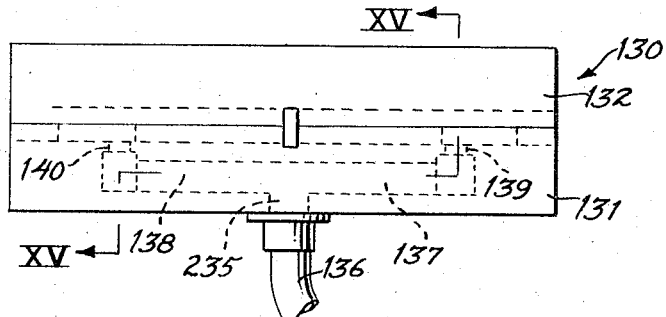
FIG. 14 is a side elevation of a modified splicing box in which halved yarn ends are stagger spliced together.

After inserting the yarns A and B, one on top of the other, as described above, the lid 12 is then closed and latched. FIG. 5 illustrates the position, or approximate positions, of the yarns A and B as seen in cross section at the center of the splicing chamber 17, after the lid 12 is closed but before the compressed air is applied. Pushbutton switch 170 of FIGS. 13 and 14 is then closed to energize the winding 175 and open the normally-closed solenoid valve 155, thereby to apply compressed air through hose 136 and connector 135 to the air-injection slot 18. The compressed air rushes up through the narrow slot 18 and a narrow shaft of air shoots up through the approximate vertical axial diameter of the superimposed yarns A and B, forcing the filaments of the yarns apart by a knifing or wedging force, as is illustrated diagrammatically in FIG. 6. The injected air then strikes the gasket 20 and rebounds therefrom downwardly. It then exhausts axially outwardly in both directions through the splicing chamber 17, through the escape holes 70 and 71 and through the notch portions 16a and 16b at the ends of the insert 15, as is illustrated diagrammatically by the arrows in FIG. 7 of the drawing. It is to be understood that the air-flow arrows in FIGS. 6 and 7 represent generally what is believed to happen with respect to the flow of the injected air. There is considerable turbulence as the compressed air escapes axially outwardly in both directions.

It is believed that because the narrow shaft of compressed air knifes up through the superposed yarns A and B and spreads the filaments apart, as indicated diagrammatically in FIGS. 6 and 9, a sort of vortex is created at this point which sucks in at least some of the injected air as it rebounds from the gasket 20. This air, which is sucked in at the vortex then apparently swirls along the interior filaments of the yarns in both axial directions, until it exhausts from the chamber 17 either through the escape holes 70 and 71 or through the notches 16a and 16b. This swirling force, together with the force applied to the exterior yarn filaments by the air which passes outwardly about the exterior filaments of the yarns, causes the filaments of the two yarns A and B to become entangled and intertwined in a braid-like fashion.

FIG. 8 is intended to illustrate the flutter and movement of the yarn filaments in the early stage of the air-splice in the region of the vortex, as viewed from the side, looking along the line VIII—VIII of FIG. 6.

FIG. 9 is a plan illustration of the vortex and adjacent portions showing the intertwined braid-like yarns A and B at a later stage of the air-splicing action. In FIG. 9, the yarns are shown to be more tightly intertwined than in FIG. 8.

It is deemed important to the method of the present invention that the filaments of the two yarns be wedged apart, preferably along their axial center lines, by the narrow shaft of injected compressed air which knifes up through the filaments, as indicated diagrammatically in FIG. 6. This allows the injected air which rebounds from the gasket 20 to be drawn down into the opening between the filaments and to pass along the interior filaments as well as along the exterior filaments. This action plays an important part in the intermingling, entanglement and braiding of the filaments and a stronger splice is thus produced.

Tests have shown that the air-splicing method described above produces a splice whose strength equals that of the yarn itself, and without increasing the diameter or denier of the spliced yarns at the splice to as great an extent as a manual or mechanical knot does. It has been found that yarns spliced by the method described above, when tested for breaking strength, will break away from the splice, and that the splice will not come apart. In a tested case, yarn spliced by the method described herein broke in an area spaced away from the splice at from 27 to 29 pounds pull, indicating that the splice was stronger than the yarn, whereas the same yarn knotted by a standard type of knot broke at the knot at from 17 to 25 pounds pull. The same yarn spliced by thermal splicing broke at from 5 to 12 pounds pull.

For best results, the compressed air (or other gas) supplied to the splicing box should be dry, that is, free of moisture and free of oil. A suitable system for supplying dry compressed air to the air-injection slot of the splicing box is shown in FIG. 13. The system there shown includes an air compressor 150, an automatic drain air-line filter 151, a particle filter 152, a pressure regulator 153, a pressure gauge 154, and a normally-closed solenoid valve 155, connected in series by the air hose 136 to the input connector 135.

Experience has shown that the pressure may also be important to a successful splice. A yarn having a denier of 1½ per filament may, for example, require only 30 p.s.i. while a yarn of 18 denier per filament may require 90 p.s.i.

Figure 17:
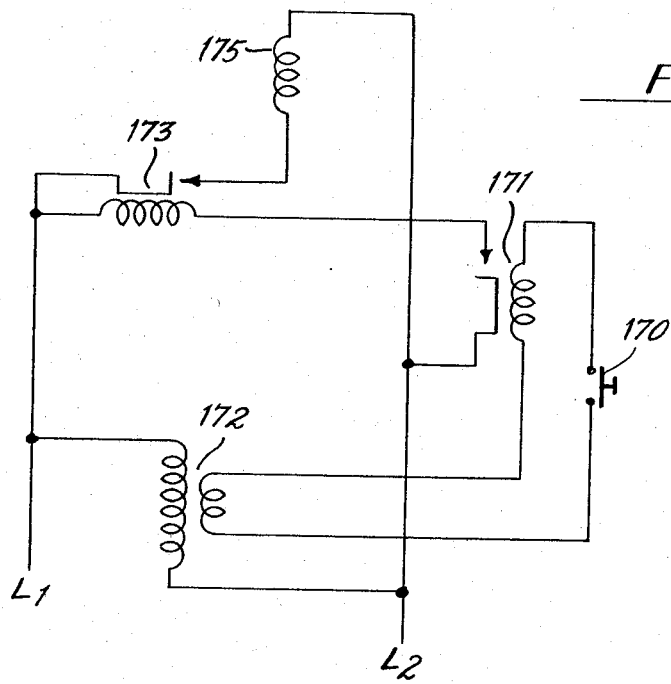
FIG. 17 is a schematic of the electric control system.

The duration of the blast of air may also be important to a successful splice. Accordingly, the system shown in FIG. 13 is controlled by an electric timer system shown in FIG. 17. In FIG. 17, a timing relay 173 controls the time period during which the solenoid valve 155 of FIG. 13 is open. When the push button 170 of FIGS. 13 and 17 is depressed, the relay 171 is energized and its contacts close. This closes the circuit through the winding of the timing relay 173 and its contacts close. This energizes the winding 175 of the solenoid 155 and the solenoid valve 155 opens for a time period determined by the timing relay 172. Timing relay 172 may preferably be a Style ACT relay of the Allen-Bradley Company, Milwaukee, Wisconsin.

Figure 11:
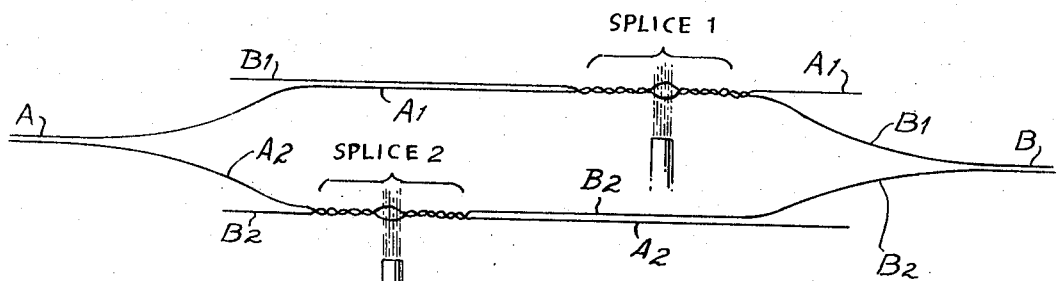
FIG. 11 is a schematic illustration showing the manner in which yarns may be halved and spliced at staggered locations.
Figure 12:
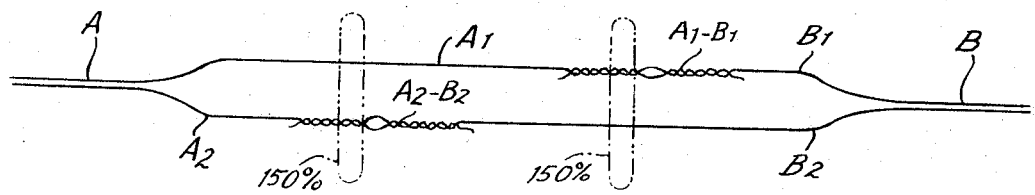
FIG. 12 is a schematic illustration showing the final stagger splice of the halved and stagger spliced yarns.
Figure 15:
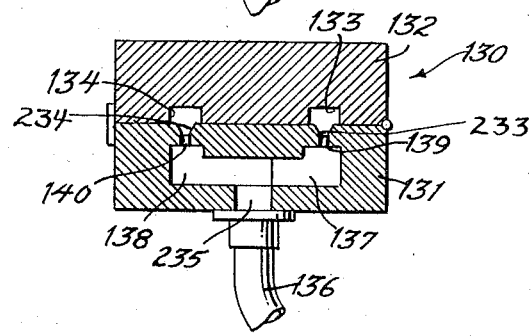
FIG. 15 is a sectional view along the line XV—XV of FIG. 14.
Figure 16:
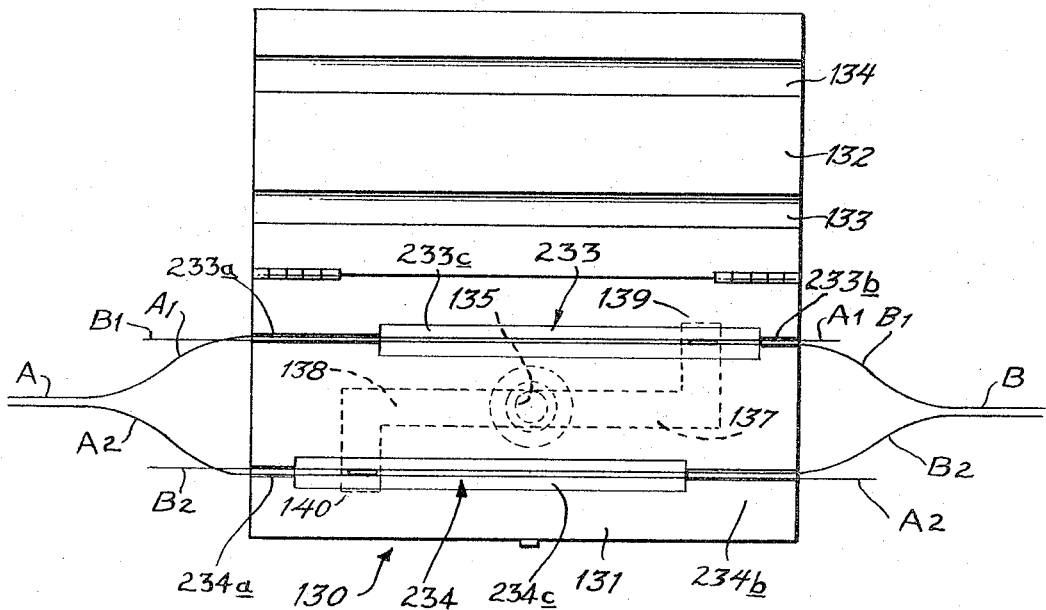
FIG. 16 is a top plan view of the splicing box of FIGS. 14 and 15 showing the box open and the halved yarn ends lying in the splicing troughs.

While the air-splicing method thus far described provides a strong splice of sufficiently small outside diameter or denier to pass through the nip of feed rolls of crimpers or the like, it may be preferable, in the splicing of some yarns to use the stagger splice method illustrated diagrammatically in FIGS. 11 and 12. Yarn A extends to the left of the drawing for an indefinite distance, while yarn B extends to the right of the drawing for an indefinite distance. At a point located to the left of the splicing zone, as viewed in FIG. 11, yarn A is divided manually by the operator into approximately two half portions, identified as A1 and A2. Similarly, at a point located to the right of the splicing zone, yarn B is divided into approximately two half portions, B1 and B2. The half portions A1 and B1 of the two yarns are placed together in superposed overlapping relation, in one passage of a double passage splicing box, and, similarly, the two half portions A2 and B2 are placed together in superposed overlapping relation in the other passage of the double passage splicing box. One form of suitable double-passage splicing box is illustrated in FIGS. 14–16, later described. Referring again to FIG. 11, in the region marked splice 1, the yarn halves A1 and B1 are subjected to a narrow shaft of injected compressed air, in a manner similar to that previously described with respect to FIGS. 1–9, and the individual filaments of A1 and B1 in this region become entangled and intermingled, and a splice is thus formed. Similarly, in the region marked splice 2, which is offset axially along the yarn from splice 1, the two half portions A2 and B2 are subjected to a shaft of compressed air and the individual filaments of A2 and B2 become entangled and intertwined and a splice is formed.

The result of the foregoing operation is shown diagrammatically in FIG. 12, which brings out that when the yarns A and B are stagger spliced, by the method and apparatus herein described, the maximum denier at each splice is only 150% of the denier of one of the yarns. These splices have been found to be sufficiently small in cross-section to pass through the nip of the feed rolls of crimpers or the like, and to pass through reeds, combs, tubes, the eyes of needles, and the like.

FIGURES 14, 15 and 16 illustrate diagrammatically a suitable splicing box 130 for making the staggered splices illustrated in FIGS. 11 and 12. The box 130 may be generally similar to the splicing box 10, previously described in connection with FIGS. 1–7, but differs therefrom primarily in that it has two passages disposed in parallel relation.

In the form illustrated in FIGS. 14–16, the base of splicing box 130 is provided with a pair of parallel grooves 233 and 234 and the lid 132 contains a pair of parallel grooves 133 and 134. The center axes of the grooves 233 and 234 in the base coincide respectively with those of the center axes of the grooves 133 and 134 in the lid so that when the lid 132 is closed upon the base 131, open-ended passages are formed in the splicing box 130.

Each of the grooves 233 and 234 in the base 131 is characterized by having a narrow rectangular notch at each end and a splicing chamber of larger cross-sectional area therebetween. In FIGS. 14–16, the groove 233 in the base, which mates with groove 133 in the lid, is comprised of the rectangular notches 233a and 233b at each end and splicing chamber 233c therebetween. The other groove 234 in the base, which mates with groove 134 in the lid, is comprised of the rectangular notches 234a and 234b at the ends and splicing chamber 234c therebetween. The air hose 136 is connected to the input opening 235 in the center of the base 131, and the input opening 135 communicates with passages 137 and 138 which extend axially in both directions from the input port. Passages 137 and 138, after running axially in opposite directions, then turn and run laterially in opposite directions, terminating in the narrow air injection slots 139 and 140 which communicate with the splicing chambers 233c and 234c, respectively.

Although not shown in the diagrammatic illustrations of FIGS. 14–16, the under surface of the lid 132, and/or the upper surface of the base 131 of splicing box 130 may be provided with a sealing gasket of suitable material.

In FIGS. 14–16, the splicing chambers 233c and 234c are illustrated as being of V-shape cross section, while grooves 133 and 134 in the lid are illustrated as being of rectangular cross section. It is to be understood, however, that other cross-sectional shapes may be used. It is also to be understood that the construction illustrated in FIGS. 14–16 is a modification of that shown in FIGS. 1–7, and that the construction of the notches and splicing chambers in the double passage splicing box 130 may be similar to that used in the single passage splicing box 10 of FIGS. 1–7.

Also, in FIGS. 14–16, the air-injection slots 139 and 140 are illustrated as being off-center relative to the splicing chambers 233c and 234c. The notches 233a and 234b may, however, be increased in length to shorten the splicing chambers to center the air-injection slots.

Figure 18:
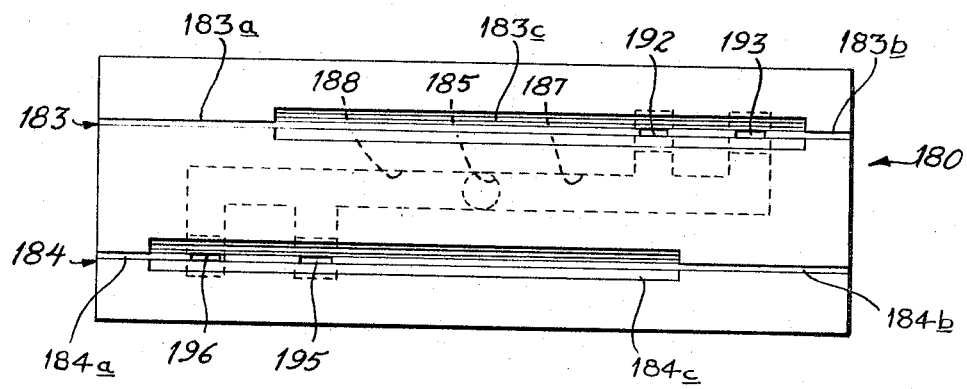
FIG. 18 is a diagrammatic illustration of a modified splicing box having four discharge slots.

Two or more air-injection slots may be used in series in some cases, either in the single passage box of FIGS. 1–7 or in the double-passage box of FIGS. 14–16. In FIG. 18, a double-passage splicing box 180 is illustrated in which each passage is provided with two air-injection slots. In FIG. 18, only the base portion of box is shown, having therein grooves 183 and 184. Groove 183 comprises end notches 183a and 183b and splicing chamber 183c. Groove 184 comprises end notches 184a and 184b and splicing chamber 184c. The air input port 185 communicates with channels 187 and 188 which extend axially in opposite directions from the central input port 185. Channel 187 then extends laterally at two points and connects with the narrow air-injection slots 192 and 193 which communicate with the splicing chamber 183c. Channel 188 extends laterally at two points in the opposite lateral direction and connects with the air-injection slots 195 and 196 which communicate with splicing chamber 184c of groove 184.

The air-splicing method of the present invention may be used for the splicing of spun yarns as well as for the splicing of continuous filament yarns. It is particularly suitable for the splicing of synthetic continuous filament yarns, including nylon and rayon, and may be used to particular advantage in the production of cord fabric in tire manufacture. Heretofore, in the manufacture of nylon cord tires, when manually knotted splicers are used, the knotted portion of the nylon yarn, when embedded in the rubber and subjected to excessive load, has been prone to frequent breaking in those portions that have been knotted because of the shearing action on the knot itself. The new splice of the present invention, embedded in rubber permits no shearing action, yet the rubber prevents the spliced and braided filaments from slipping apart. As a consequence, the new splice is especially useful when embedded in rubber, as in tires or in industrial hoses.

FIG. 10 illustrates a tire 60 with the rubber 61 broken away to reveal the cord 62 having a number of splices 63 indicated by the black indications, these splices having been made by the method and apparatus of the present application.

The present application describes a novel method and apparatus of air splicing multi-filament yarns which produces a stronger splice. The new splice can be recognized by its peculiar characteristic of having filaments of one of the yarns entangled with those of the other on both axial sides of an intermediate air-injection point, the filaments being free of entanglement at said injection point and the yarn splice being of larger denier thereat due to the looseness of the filaments, as illustrated schematically in FIG. 9.

The resultant splice has been found to have superior breaking characteristics and special advantages. As already indicated, the new splice enables the poined ends to pass through the nip of feed or crimp rolls and through reeds, combs, eyes, and the like. This enables the processing of yarn on a continuous basis.

While the preferred embodiments of this invention have been described in some detail, it will be obvious to one skilled in the art that various modifications may be made without departing from the invention as hereinafter claimed.

What is claimed is:

1. A method of splicing together the two multi-filament yarns comprising the steps of laying the end portions of the two yarns together in opposed overlapping relation in a laterally-confined longitudinally-open zone, passing a longitudinally-disposed laterally-narrow shaft of compressed air through the overlapping ends of yarns at an intermediate point in the overlap region to spread the filaments of both yarns laterally apart at said point, then exhausting said air axially along the overlapping yarn ends in opposing directions from said intermediate point to agitate and entangle the filaments of one yarn with those of the other.

2. A method of splicing together two multi-filament yarns comprising the steps of laying the two multi-filament yarns in superposed overlapping opposed relation in a laterally-confining longitudinally-unconfining region, injecting a laterally arrow wedge of compressed air vertically through the superposed yarns at an intermediate point to wedge both yarns apart laterally, and then exhausting the injected air through and along both yarns in both axial directions from said injection point to intertwine the filaments of one yarn with those of the other on both sides of said injection point.

3. A method of splicing together two multi-filament yarns A and B comprising the steps of laying the ends of the yarns A and B together with parallel axes, splitting both of the yarns axially with a sharp stream of air, then with air turbulence entangling the filaments of one of the split portions of yarn A with the filaments of one of the split portions of yarn B and entangling the filaments of the other portion of yarn B with the other portion of yarn A.

4. Apparatus for air splicing together two multi-filament yarns comprising; a splicing box having extending axially therethrough a passage open at both ends, opposite end portions of said passage having a narrow notch for receiving the yarns to be spliced in superposed overlapping relation, the intermediate portion of said passage being of enlarged cross section forming a splicing chamber; an input connection for compressed air; a laterally-narrow axially-disposed slot extending from said compressed-air input connection to said splicing chamber for injecting a narrow wedge of compressed air through said superposed yarns to spread apart the filaments thereof at said injection point, said compressed air then exhausting through said chamber in opposite axial directions.

5. Apparatus as claimed in claim 4 characterized in that said box comprises a base and a lid, in that said narrow notches are at the opposite ends of said base and said splicing chamber is located therebetween in said base, in that said lid is provided with a gasket for substantially sealing the top of said notches and the top of said splicing chamber, and in that air-escape holes are provided in said lid and gasket at opposite ends of said splicing chamber.

6. Apparatus as claimed in claim 5 characterized in that a plurality of said air-injection slots are provided in said base communicating with said splicing chamber at spaced apart locations.

7. The method of joining two multi-filament yarns comprising the steps of: dividing the end portions of each yarn to be joined into two longitudinal portions of substantially equal denier; placing one of the divided portions of one yarn in superposed overlapping relation with one of the divided portions of the other yarn with the terminal ends facing in opposite directions; placing the other of the divided portions of said one yarn in superposed overlapping relation with the other of the divided portions of the other yarn with the terminal ends facing in opposite directions; placing said first-mentioned and second-mentioned superposed overlapping portions in separate confining zones for loosely confining the yarn laterally; and projecting a narrow axial wedge of compressed air vertically through each said first-mentioned and second-mentioned superposed overlapping portions at axially spaced-apart locations within said separate confining zones, said air exiting from said confining zones in the axial directions of the yarn filaments, to effect an entangling intermingling thereof at each location, thereby to effect a stagger splice of said yarns.

8. The method claimed in claim 7 further characterized in that said air is filtered to be moisture free.

9. Apparatus for joining multi-filament yarns comprising: a splicing box having extending therethrough a pair of parallel open-ended ducts for receiving in each duct one of the longitudinally-divided yarn ends of two yarns to be spliced, said two yarns entering said ducts at opposite ends thereof; restraining means in said ducts arranged to position one yarn above the other, the divided yarn end of one yarn overlapping that of the other yarn; an input port for receiving compressed air; a narrow air-injection slot in the floor of each of said ducts, said injection slots being located at axially spaced-apart locations in said ducts; channels connecting said input port with said injection slots; and means for supplying compressed air to said input port.

10. Apparatus as claimed in claim 9 characterized in that said means for supplying compressed air includes filter means for removing moisture from said compressed air.

11. Apparatus as claimed in claim 10 further characterized in that said means for supplying compressed air includes a pressure regulator, and timing means for controlling automatically the duration of the period during which the compressed air is supplied.

12. The method defined in claim 1 wherein the width of said yarns is less than the width of said zone.

References Cited by the Examiner

UNITED STATES PATENTS

| | | | |
|---|---|---|---|
| 3,070,947 | 1/1963 | Toledo et al. | 57—22 |
| 3,125,793 | 3/1964 | Gonsalves | 57—34 X |
| 3,262,179 | 7/1966 | Sparling | 57—34 X |

FOREIGN PATENTS

| | | |
|---|---|---|
| 1,339,421 | 8/1963 | France. |
| 334,295 | 9/1930 | Great Britain. |

FRANK J. COHEN, *Primary Examiner.*

D. E. WATKINS, *Assistant Examiner.*